May 29, 1956 J. A. C. YULE 2,748,190

BLACK PRINTERS AND ELECTROOPTICAL METHODS OF MAKING THEM

Filed Sept. 15, 1951 2 Sheets-Sheet 1

JOHN A. C. YULE
INVENTOR.

BY Daniel J. Mayne
F. W. Emerson Holmes
ATTORNEYS

May 29, 1956 J. A. C. YULE 2,748,190

BLACK PRINTERS AND ELECTROOPTICAL METHODS OF MAKING THEM

Filed Sept. 15, 1951 2 Sheets-Sheet 2

JOHN A. C. YULE
INVENTOR.

BY Daniel I. Mayne
W. Emerson Holmes
ATTORNEYS

United States Patent Office | 2,748,190 Patented May 29, 1956

2,748,190

BLACK PRINTERS AND ELECTROOPTICAL METHODS OF MAKING THEM

John A. C. Yule, Rochester, N. Y., assignor to Eastman Kodak Company, Rochester, N. Y., a corporation of New Jersey Application September 15, 1951, Serial No. 246,861

21 Claims. (Cl. 178—5.4)

Figure 1:
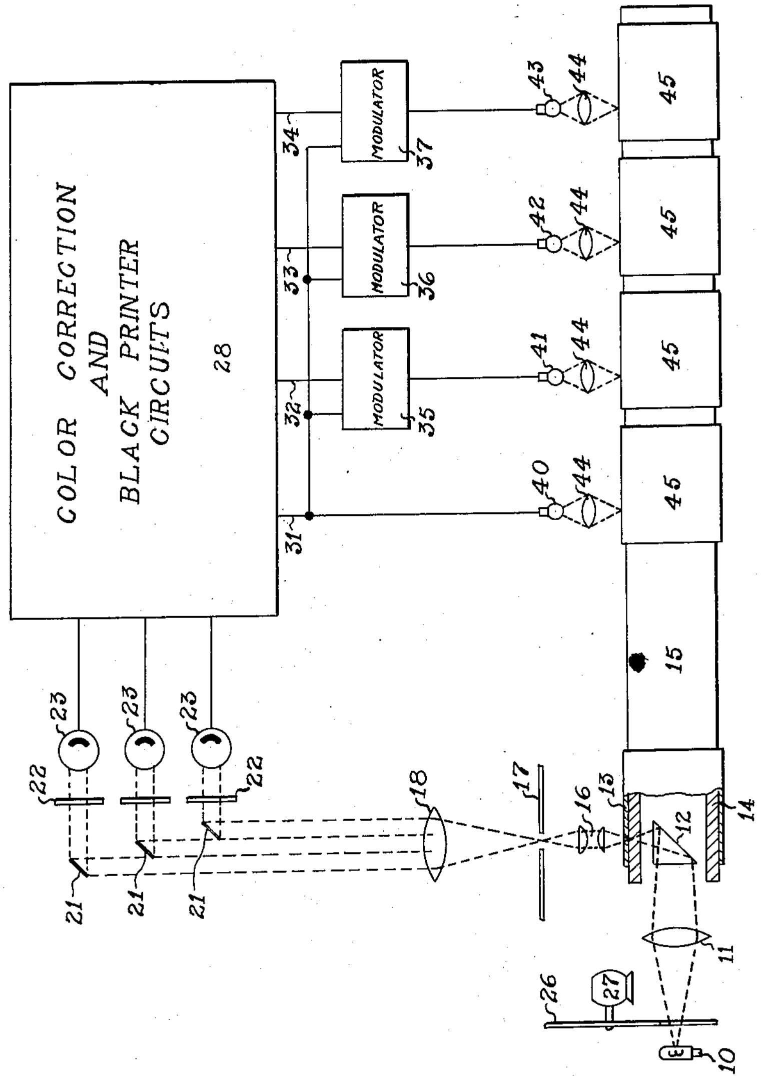
Fig.1 (PRIOR ART)

This invention relates to the black printer used in four-color processes of natural color reproduction.

Color reproduction processes normally employ four printers respectively for magenta, cyan, yellow and black inks or other coloring materials. In order to insure proper color rendition of the lighter tones and intermediate tones, it is necessary to select certain inks. Since the darkest tone available with all three inks combined is only a gray or perhaps brown shade rather than a deep black, it is common practice to add a black print to give a more pleasing reproduction of the shadows in the picture. Various forms of black printers have been proposed, but no completely satisfactory one has yet evolved. Possibly the best of the prior black printers were those whose printing density at each point equalled the least predominant subtractive color content (yellow, magenta, or cyan) at that point of the original. Theoretically such a black printer would employ black ink to as great a degree as possible and all colors could be reproduced by their black content plus two only of the other inks. It is not unusual to refer to such black printers as "ideal." Such a system of color reproduction is not perfect however, nor are the modifications thereof involving some fixed percentage of this type of black content.

One particular shortcoming of this so-called "ideal" type of black printer occurs in the reproduction of dark blue. Dark blues have relatively high magenta and cyan contents but a very low yellow content. A black printer based on the yellow content which, in this case, is the least predominant one, results in a relatively light blue in the reproduction made up of a maximum cyan, a maximum magenta and a small amount of black. The addition of further black, will reduce the saturation without changing the hue. However, to the human eye the reduced saturation is not as objectionable as the high brightness of the relatively light reproduction. Therefore by way of practical comprise, a black printer according to the present invention permits this reduction of saturation by the addition of black to the dark blues or any other hue for which yellow is the least predominant content.

According to the present invention, a novel form of black printer positive is made in which the density at each point equals the sum of two densities, one proportional to the least predominant subtractive color content and the other proportional to the visual or ortholuminous density of the corresponding point of the original. Since all color reproduction processes in which the present invention would be used are those which also involve color correction, it should be pointed out that the subtractive color content is measured after any color correction by masking or the equivalent. It is well understood that masking for color correction and black printer processes constitute two entirely different phases of color reproduction. Sometimes the color printers are both color corrected and corrected for the black printer. Nevertheless color correction and black printer correction are quite independent of each other. The visual density of the original is its density to white light. For the purpose of the present invention the primary blue light from the original has very little effect and therefore the present invention operates equally well with density measured in terms of yellow light (that is, minus blue) from the original. This is hereafter referred to as "yellow density."

In all color correction work and particularly in the black printer field, it is necessary to discuss both positives and negatives in some common terminology to cover phenomena which persist through various stages of a process. In a positive the highlights have a very low density and the shadows have a very high density, whereas the opposite is true in a negative. Thus all tones have a density greater than white in a positive and less than the density "for white" in a negative. All tones may be defined with reference to the tone for white. Those which differ least from white constitute the highlights and those which differ most from white constitute the shadows whether the record is a positive or a negative. The same terminology lends itself particularly well to the discussion of electrooptical color reproduction processes in which the various color signals are effective according to their relative values rather than according to their absolute values. Again the signal for or from white is taken as the reference standard and all of the signals may be defined with reference to their difference from their signal for white. That is, in scanning an original positive or negative each color will produce certain red, green and blue signals and white will produce certain red, green, and blue signals. For any one color, the important characteristic of the red signal, for example, is the difference between this red signal and the red signal from white. It is usual to think of a signal as relating to a negative when all of the values of the signal are equal to or greater than the corresponding signal for white, and to think of it as a positive when the maximum signal is that from white. Thus a light beam whose intensity is proportional to a positive signal will print a negative, and vice-versa. One particularly pertinent use of this terminology is in connection with prior art electro-optical systems in which the above discussed "ideal" type of black printer is made. The black printer signal in this case is proportional to that one of the color printer signals which differs least from the corresponding signal for white.

In the present invention a signal is produced which is proportional to the visual density of the original plus the least predominant subtractive color content of the original or the content which differs least from white and this signal is used for controlling the intensity of a light beam scanning a sensitive film. The invention in terms of producing an electrooptical black printer signal, consists of producing a signal proportional to the color signal which differs least from the corresponding signal for white and then modifying this signal by a factor proportional to the red and green components of the original, i. e., the yellow density of the original or proportional to the red and green, and also the blue, components, i. e. the visual as ortholuminous density of the original.

One of the more important advantages found with this invention is the improvement or increase in the natural quality of the tone relationships in the highlight and shadow regions of the reproduction.

Figures 2, 3:
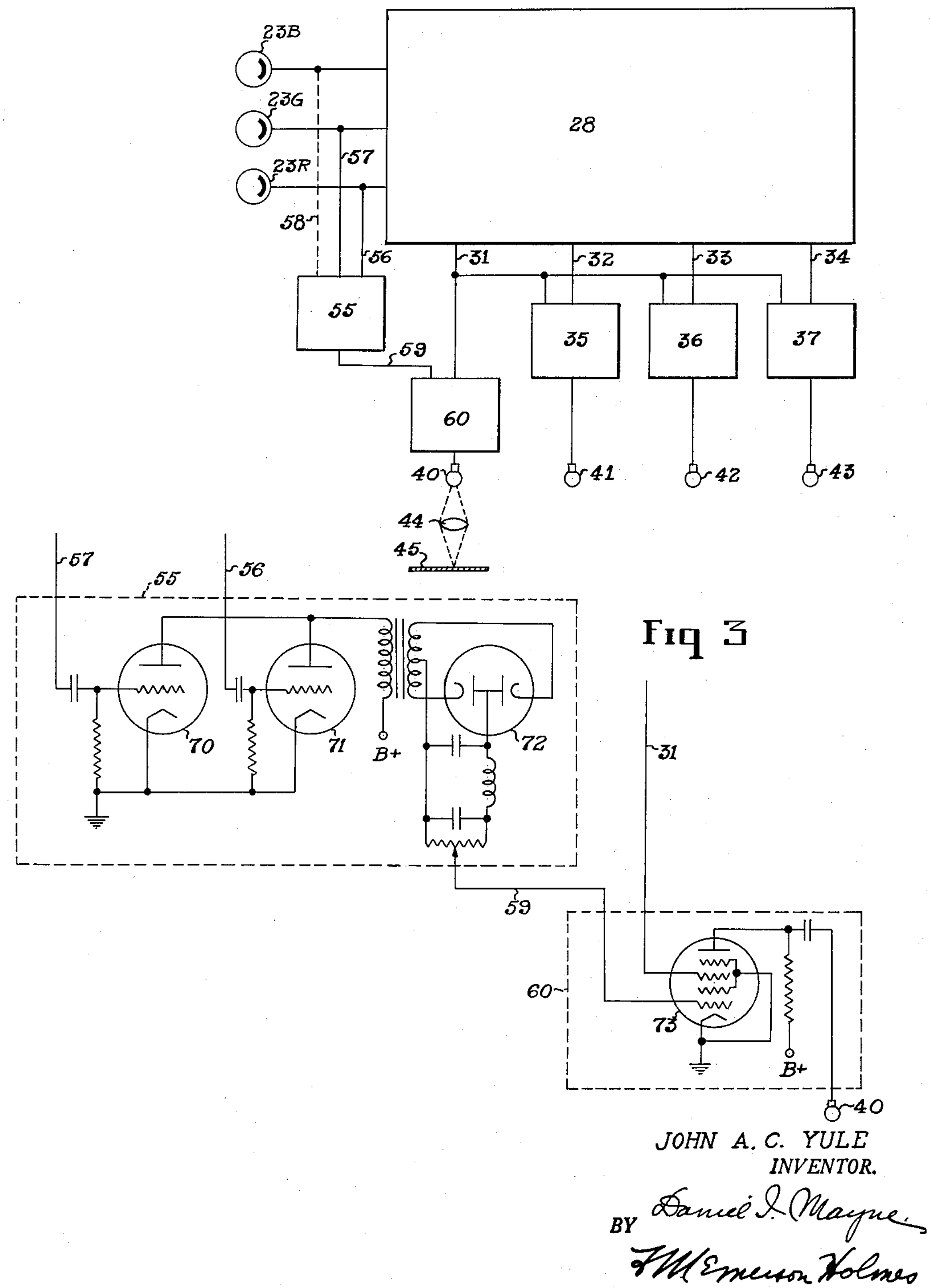

The operation of the invention will be fully understood from the following description when read in connection with the accompanying drawings in which:

Fig. 1 is a schematic view of an electrooptical system according to the prior art;

Fig. 2 similarly illustrates a modification of this prior art system to provide a black printer according to the present invention;

Fig. 3 shows an example of an electric circuit for use in the part of Fig. 2 which relates to the present invention;

In Fig. 1 light from a source 10 is focused by a lens 11 and prism 12 to illuminate a point on a color transparency 13 mounted on a rotating cylinder 15, one end 14 of which is made of glass. Light from the transparency is focused by a microscope objective 16 on to an aperture in a mask 17, which aperture constitutes the means for defining the effective area of the scanning spot. The light transmitted by this aperture is collimated by a lens 18 and split into three beams by reflectors 21 which reflect the light through primary color filters 22 onto photocells 23.

According to the prior art the signals from the photocells 23 are amplified and modulated in a circuit 28 to produce a black printer signal on wire 31 which is proportional to the greatest of the primary color signals after color correction (or to the least of these signals if a negative is being scanned or if the signals are being inverted in the circuit). The selection of the greatest or least signal is made after color correction, if any, is introduced in the circuit. For example the green signal is usually modified by red and the blue signal is usually modified by green. The corrected signals corresponding to the red, green and blue are produced along wires 32, 33 and 34. At this stage the signals are usually referred to as the cyan, magenta and yellow printer signals. It is also customary according to the prior art, to reduce these signals or more precisely to decrease the difference between them and the corresponding signal for white in terms of the black printer signal. This is done in the modulators 35, 36, and 37 respectively. Thus the black printer signal is imposed on a glow lamp 40 and the color corrected and black corrected color printer signals are imposed respectively on glow lamps 41, 42, and 43. The light from these lamps is focused by lenses 44 on to four photosensitive films 45, carried by the rotating cylinder 15 to be scanned synchronously with the original multicolored transparency 13.

In Fig. 2, the same circuit layout is shown except that the black printer signal on the wire 31 is increased in proportion to the visual density or at least to the yellow density of the original. This is conveniently done by tapping off part of the signal from the photocells 23 along wires 56, 57, and 58 and then combining them additively in a circuit 55 to produce a signal proportional to the sum of the red and green signals from photocells 23R and 23G, with or without the addition of the signal from the blue photocell 23B. Since the blue signal is optional, the wire 58 is shown by broken lines. In fact, in practice the amount of each signal is selected at will and a very small fraction of the blue signal is normally used but the results are in general not very different from that obtained when no blue signal at all is used other than that inadvertently transmitted by the green filter to appear on wire 57. The output of the visual density circuit 55 passes along wire 58 to the modulator circuit 60 to be added to the black printer signal. Actually the signals are usually linear quantities whereas density in the photographic sense is a logarithmic quantity and therefore the product of the signals on the wires 31 and 59 is the quantity required. Therefore the circuit 60 merely multiplies the two signals. If the signals have been subjected to logarithmic amplifiers, addition of the two logarithmic quantities is required. Actually this addition or increase of the black printer signal in terms of visual density is a compromise and it is not very important whether a straight linear addition or multiplication or any other mathematical function of the "increasing type" is provided. Neither does it matter whether the circuits have constant amplification and constant relationships throughout the whole range. The important point according to the present invention is to increase the black printer signal in proportion to the visual density or yellow density of the original. The preferred form of this increase depends on the desired tone reproduction characteristics of the reproduction and the actual tone reproduction characteristics of all the other steps of the reproduction process.

In Fig. 3 the details of one form for each of the circuits 55 and 60 are shown. The signal on wire 57 is fed into the grid of a triode 70 in parallel with a similar triode 71 which receives the signal on the wire 56. A third signal could be added simply by connecting the wire 58 of Fig. 2 to the grid of a third triode in this parallel arrangement. The sum of the two signals is rectified in a rectifier 72 and a portion thereof is selected and passed along the wire 59 to the first control grid of a multigrid tube 73 whose third control grid receives the black printer signal proportional to the least predominant subtractive color content of the original along wire 31. The output of the multigrid tube 73 controls the glow lamp 40. This Fig. 3 merely represents one form of circuit for operation of the present invention and it should be understood that various forms of circuits are equally useful for this invention.

Having thus described the preferred embodiment of my invention, I wish to point out that it is not limited to this structure in any way but is of the scope of the appended claims.

I claim:

1. In an electrooptical color reproduction process having three circuit channels carrying signals respectively proportional to the primary red, green and blue components from a scanned multicolored positive original and carrying in subsequent sections of the channels color corrected signals corresponding positively to said primary components, the method of producing a black printer signal which comprises producing in a fourth channel a signal proportional to the greatest of the color corrected signals and decreasing said greatest signal by a factor inversely proportional to said green and red components.

2. In an electrooptical color reproduction process having three circuit channels carrying signals respectively proportional to the primary red, green and blue components from a scanned multicolored positive original and carrying in subsequent sections of the channels color corrected signals corresponding negatively to said primary components, the method of producing a black printer signal which comprises producing in a fourth channel a signal proportional to the least of the color corrected negative signals and increasing said least signal by a factor inversely proportional to said green and red components.

3. In an electrooptical color reproduction process having three circuit channels carrying signals respectively negatively proportional to the primary red, green and blue components from a scanned multicolored original and carrying in subsequent sections of the channels color corrected signals corresponding also negatively to said primary components, the method of producing a black printer signal which comprises producing in a fourth channel a signal proportional to the least of the color corrected negative signals and increasing said least signal by a factor proportional to the negative green and red component signals.

4. In an electrooptical color reproduction process having blue filter, green filter and red filter signals corresponding to the primary color components of a scanned multicolored original and three circuit channels carrying color corrected signals corresponding to said three filter signals, the method of producing a black printer signal which comprises producing in a fourth channel a signal proportional to that one of the color corrected signals which differs least from its value for white and modifying said least signal increasing the difference between it and a signal from white by a factor proportional to the difference between said green filter signal and a green signal from white and to the difference between said red filter signal and a red signal from white.

5. The method according to claim 4 in which said increasing is by a factor also proportional to the difference between said blue filter signal and a blue signal from white.

6. In an electrooptical scanning process for the reproduction of a multicolored original and having four circuit channels three respectively carrying color corrected yellow, magenta and cyan printer signals and the fourth carrying a signal proportional to the one of the three printer signals which differs least from the corresponding signal for white, the method of producing an ultimate black printer signal which comprises producing in a fifth channel a signal proportional to the ortholuminous density of the scanned original and modifying said least signal increasing the difference between it and the corresponding signal from white by a factor proportional to the difference between said ortholuminous density signal and the ortholuminous density signal from white.

7. In an electrooptical scanning process for the reproduction of a multicolored original and having four circuit channels three respectively carrying color corrected yellow, magenta and cyan printer signals and the fourth carrying a signal proportional to the one of the three printer signals which differs least from the corresponding signal for white, the method of producing an ultimate black printer signal which comprises producing in a fifth channel a signal proportional to the yellow density of the scanned original and modifying said least signal increasing the difference between it and the corresponding signal from white by a factor proportional to the difference between said yellow density signal and the yellow density signal from white.

8. For use in the reproduction of a multicolored original, a black printer positive having at each point a density equal to the sum of two densities, one of which is proportional to that of the least predominant subtractive color content, as color corrected, of the corresponding point of the original and the other of which is proportional to the ortholuminous density of said corresponding point.

9. For use in the reproduction of a multicolored original, a black printer positive having at each point a density equal to the sum of two densities, one of which is proportional to that of the least predominant subtractive color content, as color corrected, of the corresponding point of the original and the other of which is proportional to the density of said corresponding point of the original to yellow light.

10. For use in the reproduction of a multicolored original, a black printer negative having at each point a density which is less than the maximum density for white by the sum of two densities, one of which is proportional to that of the least predominant subtractive color content, as color corrected, of the corresponding point of the original and the other of which is proportional to the ortholuminous density of said corresponding point.

11. For use in the reproduction of a multicolored original, a black printer negative having at each point a density which is less than the maximum density for white by the sum of two densities, one of which is proportional to that of the least predominant subtractive color content, as color corrected, of the corresponding point of the original and the other of which is proportional to the density of said corresponding point of the original to yellow light.

12. For use in the reproduction of a multicolored original, a black printer record having at each point a density which differs from the density for white by the sum of two densities, one of which is proportional to that of the least predominant subtractive color content, as color corrected, of the corresponding point of the original and the other of which is proportional to the ortholuminous density of said corresponding point.

13. For use in the reproduction of a multicolored original, a black printer record having at each point a density which differs from the density for white by the sum of two densities, one of which is proportional to that of tthe least predominant subtractive color content, as color corrected, of the corresponding point of the original and the other of which is proportional to the density of said corresponding point of the original to yellow light.

14. In an electrooptical system for the reproduction of a multicolored original, the method of making a black printer record which comprises producing in an electric circuit a scanning signal proportional at each point to the ortholuminous density plus the least predominant subtractive color content of the corresponding point of the original, scanning a photosensitive layer with a variable intensity light beam, synchronously with said scanning signal, controlling said intensity in accordance with said signal and processing the layer to a photographic record.

15. In an electrooptical system for the reproduction of a multicolored original, the method of making a black printer record which comprises producing in an electric circuit a scanning signal proportional at each point to the density to yellow light plus the least predominant subtractive color content of the corresponding point of the original, scanning a photosensitive layer with a variable intensity light beam, synchronously with said scanning signal, controlling said intensity in accordance with said signal and processing the layer to a photographic record.

16. In a method of exposing a black printer emulsion wherein a colored original is scanned to provide electrical signals representative of variations in three primary color components, respectively, the steps of continuously selecting the instantaneous maximum of said signals to provide a normal black signal, modifying said normal black signal in accordance with a function of the sum of signals proportional to the electrical signals representative of variations in said three primary color components, and exposing the black printer emulsion in accordance with said modified black signal in synchronism with said colored original.

17. In a method of exposing a black printer emulsion wherein a colored original is scanned to provide electrical signals representative of variations in three primary color components, respectively, the steps of continuously selecting the instantaneous maximum of said signals to provide a normal black signal, modifying said normal black signal in accordance with a function of the sum of signals proportional to the electrical signals representative of variations in said three primary color components to increase reproduction of black in the shadow regions of the colored original, and exposing the black printer emulsion in accordance with said modified black signal in synchronism with said colored original.

18. In a method of exposing a black printer emulsion wherein a colored original is scanned to provide electrical signals representative of variations in three primary color components, respectively, the steps of continuously selecting the instantaneous maximum of said signals to provide a normal black signal, multiplying said normal black signal with a correction signal that is a function of the sum of signals proportional to the electrical signals representative of variations in said three primary color components, and exposing the black printer emulsion in accordance with the product signal in synchronism with the scanning of said colored original.

19. In apparatus for exposing a black printer emulsion wherein a black signal is generated in accordance with a function of the instantaneous maximum of color signals employed to expose color separation emulsions, the combination of means for generating an ortholuminous signal, means for obtaining from said ortholuminous signal a correction signal that is a function of said ortholuminous signal, means for multiplying said black signal and said correction signal to obtain a modified black signal, and means for exposing said black printer emulsion in accordance with said modified black signal.

20. In apparatus for exposing a black printer emulsion wherein a black signal is generated in accordance with a function of the instantaneous maximum of color signals employed to expose color separation emulsions, the combination of means for adding the amplitudes of the color signals in a predetermined ratio to obtain a sum signal, means for multiplying said black signal and said sum signal to obtain a modified black signal, and means for exposing said black printer emulsion in accordance with said modified black signal.

21. In apparatus for exposing a black printer emulsion wherein a colored original is scanned to provide electrical signals representative of variations in three primary color components, respectively, the combination of means for continuously selecting the instantaneous maximum of said signals to provide a normal black signal, means for multiplying said normal black signal with a function of the sum of signals proportional to the electrical signals representative of variations in said three primary color components to increase reproduction of black in the shadow regions of the colored original and means for exposing the black printer emulsion in accordance with said modified black signal in synchronism with said colored original.

References Cited in the file of this patent

UNITED STATES PATENTS

| | | |
|---|---|---|
| 2,165,168 | Hardy | July 4, 1939 |
| 2,185,139 | Wurzburg | Dec. 26, 1939 |
| 2,193,722 | Hardy | Mar. 12, 1940 |
| 2,231,668 | Hall | Feb. 11, 1941 |
| 2,253,086 | Murray | Aug. 19, 1941 |
| 2,272,638 | Hardy | Feb. 10, 1942 |
| 2,316,581 | Hardy | Apr. 13, 1943 |
| 2,413,706 | Gunderson | Jan. 7, 1947 |
| 2,415,051 | Thompson | Jan. 28, 1947 |
| 2,434,561 | Hardy | Jan. 13, 1948 |
| 2,509,038 | Goldsmith | May 23, 1950 |
| 2,560,457 | Gunderson | July 17, 1951 |
| 2,571,322 | Yelland | Oct. 16, 1951 |
| 2,606,245 | Hall | Aug. 5, 1952 |